Figure 1:
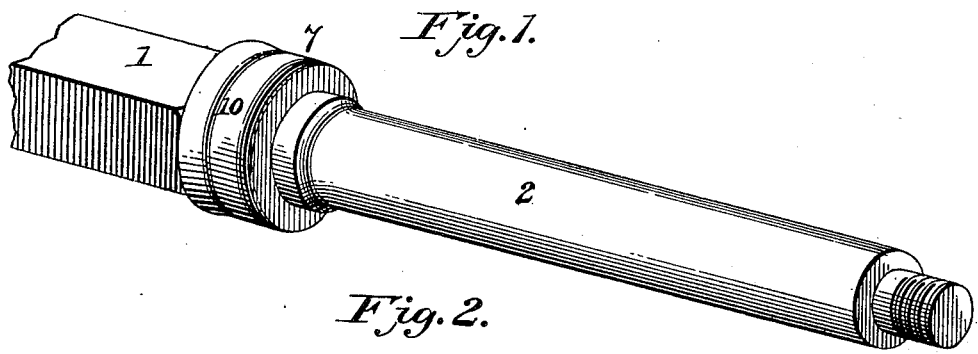

No. 649,603. Patented May 15, 1900.
G. W. HEDRICK.
AXLE COLLAR WASHER.
(Application filed Oct. 11, 1899.)
(No Model.)

Witnesses
Edwin G. McKee
L. P. Holshaupter

George W. Hedrick, Inventor
By C. G. Siggers, Attorney

THE NORRIS PETERS CO., PHOTO-LITHO., WASHINGTON, D. C.

UNITED STATES PATENT OFFICE.

GEORGE W. HEDRICK, OF DAYTON, VIRGINIA.

AXLE-COLLAR WASHER.

SPECIFICATION forming part of Letters Patent No. 649,603, dated May 15, 1900.

Application filed October 11, 1899. Serial No. 733,301. (No model.)

*To all whom it may concern:*

Be it known that I, GEORGE W. HEDRICK, a citizen of the United States, residing at Dayton, in the county of Rockingham and State of Virginia, have invented a new and useful Axle-Collar Washer, of which the following is a specification.

This invention relates to axle-collar washers; and the object in view is to provide a novel form of washer adapted particularly for use upon vehicle-axles for the purpose of preventing wear upon the sand-collar at the inner end of the axle-spindle and at the same time preventing the objectionable noise caused by the inner end of the axle-box striking and bearing directly against said collar.

The invention contemplates the construction of a washer, of flexible material, comprising a shoulder or flange portion and a rim portion adapted to be compressed into interlocking engagement with the sand-collar, whereby it is retained in place on the axle when the wheel containing the axle-box is removed. The said washer prevents sand, dirt, and other foreign matter from obtaining access to the axle-box and also retains the oil or lubricant in the axle-box.

Other objects and advantages of the invention will appear in the course of the ensuing description.

The invention consists in certain novel features and details of construction and arrangement of parts, as hereinafter fully described, illustrated in the drawings, and incorporated in the claims.

Figure 2:
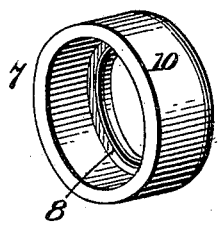
Figure 3:
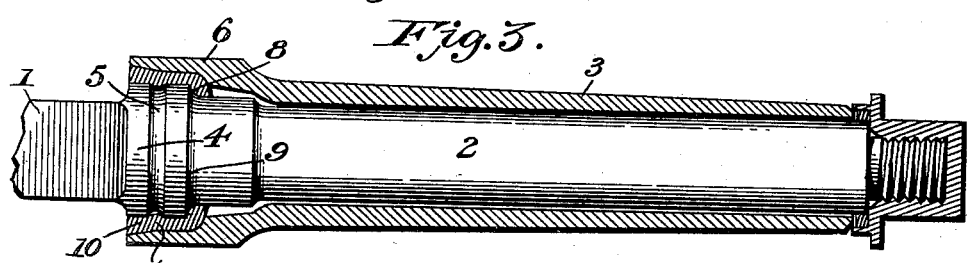
Figure 4:
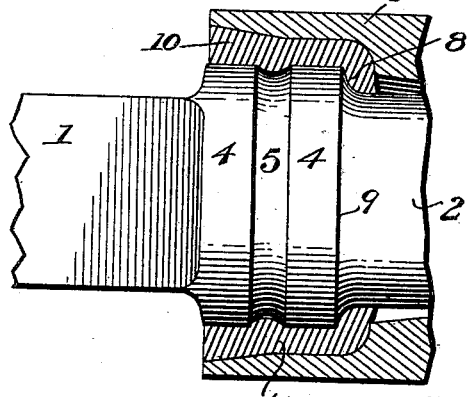

In the accompanying drawings, Figure 1 is a perspective view of a portion of an axle, showing the improved washer applied thereto. Fig. 2 is a detail perspective view of the washer, *per se*. Fig. 3 is a longitudinal section through an axle-box, showing the washer also in section and the axle and spindle in elevation. Fig. 4 is an enlarged detail longitudinal section through the axle-box and washer, showing the interlocked engagement between the washer and sand-collar of the axle.

Similar numerals of reference designate corresponding parts in all the figures of the drawings.

For the purpose of illustrating the present invention I have shown an ordinary vehicle-axle 1, having the usual spindle 2, and have also shown the ordinary axle-box 3. The axle is provided at the inner end of the spindle with the usual sand-collar 4, having the annular sand-groove 5, while the axle-box is provided with an enlarged inner end forming the annular flange 6, which fits over and surrounds the sand-collar, all of said parts being of the ordinary construction and arrangement.

The washer forming the subject-matter of this invention and indicated at 7 is composed of flexible material, and while this material preferably consists of leather it is within the scope of this invention to construct the washer of gum, paper, or any other material which will adapt the washer to yield and be compressed into interlocked engagement with the sand-collar, as hereinafter described.

The washer 7 comprises an annular flange or shoulder 8, which is adapted to abut against the shoulder 9, formed by the outer end of the sand-collar on the axle, and the washer further comprises a rim or collar-encircling portion 10, which is adapted to fit snugly over and surround and inclose said sand-collar, as illustrated in the sectional views.

The washer 7 is slipped over the end spindle and properly positioned with respect to the sand-collar, as hereinabove described, and the axle-box is then slid upon a spindle until its enlarged inner end or flange fits around the washer. By rotating the axle-box the rim or collar-encircling portion of the washer is then compressed tightly around the sand-collar and at the same time is frictionally engaged by the inner surface of the enlarged portion of the axle-box and rotated therewith. The result is that the rim portion of the washer is compressed tightly on the sand-collar and the inner surface of the washer is pressed partially in the sand-groove. In this way the washer is pressed into interlocked engagement with the sand-collar, so that when the axle-box is subsequently removed the washer will be retained in its position upon the axle. When, however, the axle-box is replaced, it frictionally engages the outer surface of the washer, taking up the latter and causing it to rotate with the axle-box and around the sand-collar on the axle. A close contact being thus established between the washer and the axle-box, sand and other foreign matter are prevented from getting into the axle-box, and at the same time the lubricant contained in the box is prevented from escaping.

In view of the above description it will be seen that the interposition of the washer between the axle-box and sand-collar prevents wear upon the sand-collar and maintains the original shape of the latter. It also does away with the disagreeable rattling and noise incident to the ordinary construction, in which no flexible washer is employed and the axle-box wears and grinds upon the sand-collar, the grinding action being accelerated by the presence of sand or grit which finds its way around the sand-collar. In carrying out these objects the invention is especially useful in connection with old axles where the sand-collar has become worn, thus obviating the necessity and expense of renewing the spindles.

It will also be seen that the sand, grit, or other foreign matter working in under the rim portion of the washer will embed itself in the flexible material of which the washer is composed and will be thereby prevented from grinding upon the sand-collar.

Having thus described the invention, what is claimed as new, and desired to be secured by Letters Patent, is—

1. A flexible axle-collar washer comprising a cylindrical portion to encircle the axle-collar, and an inturned flange at one end to bear against the end of the collar, said cylindrical portion being coextensive with the periphery of the axle-collar, and adapted to be compressed thereon by the axle-box, substantially as described.

2. The combination with an axle provided with a sand-collar, of a washer of flexible material having a rim portion which fits around the collar and is compressed to interlock with the groove, said washer also having an inturned annular flange which abuts against the collar, substantially as specified.

In testimony that I claim the foregoing as my own I have hereto affixed my signature in the presence of two witnesses.

GEO. W. HEDRICK.

Witnesses:
 JOHN H. SIGGERS,
 NELLIE VAN METRE.